(12) United States Patent
Holding et al.

(10) Patent No.: US 10,294,980 B2
(45) Date of Patent: May 21, 2019

(54) CONTROL CABLE QUICK DISCONNECT

(71) Applicant: Goodrich Actuation Systems Limited, Solihull, West Midlands (GB)

(72) Inventors: James Holding, Cannock (GB); Scott Haldron, Wolverhampton (GB); John Harvey, Wolverhampton (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 0 days.

(21) Appl. No.: 15/642,766

(22) Filed: Jul. 6, 2017

(65) Prior Publication Data
US 2018/0013234 A1 Jan. 11, 2018

(30) Foreign Application Priority Data

Jul. 7, 2016 (EP) .................................... 16178425

(51) Int. Cl.
*F16C 1/10* (2006.01)

(52) U.S. Cl.
CPC .............. *F16C 1/101* (2013.01); *F16C 1/105* (2013.01); *F16C 2226/70* (2013.01); *F16C 2226/76* (2013.01)

(58) Field of Classification Search
CPC .. F16C 2226/70; F16C 2226/76; F16C 1/105; F16C 1/101
See application file for complete search history.

(56) References Cited

U.S. PATENT DOCUMENTS

| 2,497,467 | A | * | 2/1950 | Peters | ...................... F16C 1/14 24/68 CT |
| 5,577,415 | A | * | 11/1996 | Reasoner | ................ F16C 1/101 403/327 |
| 5,584,212 | A | | 12/1996 | Wild | |
| 6,109,132 | A | | 8/2000 | Frye | |
| 6,324,938 | B1 | | 12/2001 | Okouchi | |

(Continued)

FOREIGN PATENT DOCUMENTS

| EP | 0774591 A2 | 5/1997 |
| FR | 2805585 A1 | 8/2001 |

(Continued)

OTHER PUBLICATIONS

Extended European Search Report for International Application No. 16178425.1, dated Dec. 16, 2016, 10 pages.

*Primary Examiner* — Patrick Cicchino
(74) *Attorney, Agent, or Firm* — Cantor Colburn LLP

(57) ABSTRACT

A quick connect and disconnect arrangement for a cable comprises a housing for holding the cable. The housing comprises a first section and a second section. One of the first section and the second section comprises a protruding lug having an aperture therein and the other of the first section and the second section comprises a locking system. The locking system comprises a channel, an opening disposed along a portion of the channel and for receiving the lug, and a bolt configured to move within the channel. When, in use, the housing is closed around the cable, the lug is positioned in the opening, the channel is aligned with the aperture and the bolt is configured to move within the channel in order to engage with the aperture and thereby retain the lug in the opening.

11 Claims, 8 Drawing Sheets

(56) References Cited

U.S. PATENT DOCUMENTS

| | | | |
|---|---|---|---|
| 7,041,903 B2 * | 5/2006 | Odahara | F16C 1/105 174/135 |
| 7,597,027 B2 * | 10/2009 | Kwon | F16C 1/105 248/56 |
| 7,609,924 B2 * | 10/2009 | Anderson | F16C 1/101 385/100 |
| 2005/0115730 A1 | 6/2005 | Odahara et al. | |
| 2009/0175676 A1 * | 7/2009 | Ficyk | F16C 1/101 403/123 |
| 2017/0051781 A1 * | 2/2017 | Sano | F16C 1/145 |
| 2017/0254354 A1 * | 9/2017 | Carabalona | E05B 53/005 |

FOREIGN PATENT DOCUMENTS

| | | |
|---|---|---|
| JP | H11141530 A | 5/1999 |
| JP | 3066352 B2 | 7/2000 |

\* cited by examiner

CONTROL CABLE QUICK DISCONNECT

FOREIGN PRIORITY

This application claims priority to European Patent Application No. 16178425.1 filed Jul. 7, 2016, the entire contents of which is incorporated herein by reference.

TECHNICAL FIELD

The present invention relates to a quick disconnect arrangement for a cable, in particular in the field of control cables in aircraft.

BACKGROUND

It is known in the art to provide a control cable passing through the bulkhead on an aircraft to the engine. Operation of the control cable by applying a tensile force to the cable causes the control cable to provide a maintenance operation on the engine from a distance by transmitting the applied load to the engine via the cable. One of the disadvantages with the current system is that a single long control cable is provided which makes engine installation and maintenance very difficult as the control cable passes through the bulkhead.

One possible solution is to provide two cables which join together in an easily connectable and disconnectable manner. This would allow quick and efficient maintenance of the engine without the difficulty of the relevant part of the control cable passing through the bulkhead.

It is known to provide a first cable with a first enlarged cylindrical end portion. A second cable is provided with a second larger hollow cylindrical end portion. The hollow cylindrical end portion is partially cut away on the curved surface of the cylinder to allow the first enlarged end portion to be slotted into the second hollow cylindrical end portion. An end of the second hollow cylindrical end portion distal from the second cable has a narrowing section, such that the first cable but not the first enlarged portion can pass through the second end portion. This arrangement may be known as a hammer joint. Accordingly, once the cables are connected in the manner explained and held in tension, there should be no further slippage.

However in many applications such as aircraft, it is quite common for there to be vibrations and other environmental effects which may cause the cables to disconnect even when in tension against one another. Cables may even become disconnected in non-vibration conditions if they are not sufficiently guided to avoid uncoupling during translation of the cable within the housing. Accordingly, it is desirable to provide a housing to hold the cables in place once connected.

JP 3066352 discloses a housing for surrounding two connected cables for an engine throttle system. The housing has a moulded inner surface to fit the shape of the cable end portions and cable covers. The housing can open and close quickly and easily by activation of a snap-fit clasp. However, since such a clasp is designed to be opened and closed easily by a user carrying our maintenance, then the fit of the clasp has to be sufficiently weak that the clasp may easily jump open if subject to vibrations on an aircraft. It is desirable to provide a housing which can quickly and easily open and close by human intervention but that will not open in error when subject to external conditions such as vibrations and the like.

FR 2805585 similarly discloses a snap-fit arrangement which will either come loose during vibration or be too tight to allow easy connection and disconnection by hand during maintenance. Snap fit arrangements are also taught in EP 0774591 and a clip-type fit, suitable for a bicycle but not an aircraft, is taught by U.S. Pat. No. 6,324,938.

Accordingly, it is desirable to provide a quick connect and disconnect arrangement with an easily connectable and disconnectable cable that will be secure when subject to exacting environmental conditions such as vibrations on an aircraft, but will be easily separable by a person carrying out maintenance.

SUMMARY

Viewed from a first aspect, the invention provides a quick connect and disconnect arrangement for a cable comprising: a housing for holding the cable, the housing comprising a first section and a second section; wherein one of the first section and the second section comprises a protruding lug having an aperture therein; wherein the other of the first section and the second section comprises a locking system, the locking system comprising: a channel; an opening disposed along a portion of the channel and for receiving the lug; and a bolt configured to move within the channel; wherein when, in use, the housing is closed around the cable: the lug is positioned in the opening; the channel is aligned with the aperture; and the bolt is configured to move within the channel in order to engage with the aperture and thereby retain the lug in the opening.

The cable may comprise two cable parts which are joined together when they are held within the housing, for example, two cable parts joined by a hook/latch joint, such as a hammer joint or other easily separable joint. The arrangement of the first aspect, when in use, may include such a cable. The arrangement of the first aspect can provide a housing which can be locked and unlocked without the need for tools and can be used with a cable that can be connected and disconnected without the need for tools. Moreover, since there are no removable parts such as nuts or bolts, then there is no risk of these being dropped and lost and/or causing structural damage in the process. Such damage is known as Foreign Object Damage, or "FOD" and prevention of FOD is very important on aircraft where structural integrity is of utmost importance. Additionally, the above provides a possibility for single-handed locking and unlocking of the housing which ensures quicker and simpler connection and disconnection of the cable. Furthermore, when the housing is locked by the interlocking of the bolt and the lug to secure the lug in the opening, such a connection is very secure against aircraft conditions, such as vibrations during flight. Accordingly, the two joined cables will not be able to separate even under aircraft vibration conditions unless the housing is specifically opened.

The housing may have a shaped or profiled inner surface to fit the cable, such that when housed in the housing, the cable have negligible movement in a radial direction of the cable, while still being able to translate axially under tensile loading through the housing. This allows the housing to keep a two-part cable, for example a cabled joined with a hammer joint, from becoming disconnected.

In some arrangements, the first and second sections of the housing may be connected together at one end by a hinge. The hinge may be at a position spaced apart from the locking system. In such embodiments, the first and second sections of the housing rotate about the hinge axis and are constantly joined at the hinge during normal use.

The housing may be resiliently biased toward the open position, for example via a sprung hinge, such that unlocking the housing causes the two sections of the housing to spring apart from one another. This can allow a faster connect and disconnect with one handed operation.

In other arrangements, the first and second sections of the housing may be separable such that one section can be completely removed from connection with the other section. For example there may be provided two locking systems as defined above, where the second locking system may replace the hinge mentioned above. The benefits of providing two locking systems may be realised in a case where the quick disconnect is for maintenance by either a left-handed person or a right-handed person. Since it is beneficial for the quick-disconnect to be easily achieved using only one hand, such arrangements may make a more easily usable quick disconnect. Additionally, provision of two locking systems allows the orientation of the quick connect and disconnect arrangement to vary while still allowing the quick connect and disconnect to be easily achievable.

In some arrangements having two separate locking systems, each of the first and second housing sections may comprise a lug and a locking system. In other arrangements having two separate locking systems, one of the housing sections comprises the lugs and the other comprises the locking systems.

When the channel is aligned with the aperture in the lug, the channel and aperture may form a single channel when the housing is closed around the cables.

Preferably, movement of the bolt within the channel at the point at which it passes through the lug may be in a direction having a perpendicular component compared to the lug movement in the opening. The limit of this feature would be where the motion of the bolt is in a direction orthogonal to the movement of the lug within the opening; however it is envisioned that there may be an acute angle between the directions of motion of the lug and the bolt. Accordingly, as long as the movement directions of the bolt within the channel and the lug within the opening are not parallel to one another, then by the bolt passing through the lug aperture, motion of the lug within the opening can be prevented.

When in a locked position, the bolt may be positioned in a portion of the channel which traverses the opening, including a portion on each side of the opening, or the bolt may traverse part of the channel and at least part of the opening. When in an unlocked position, the bolt may be positioned in a portion of the channel which does not traverse the opening, or the bolt may traverse part of the channel and at least part of the opening.

The arrangement may comprise a biasing mechanism. The biasing mechanism may urge the bolt within the channel towards the portion having the opening. The biasing mechanism may for example comprise a spring, gas spring, or any other type of biasing arrangement.

When the lug is positioned within the opening, the biasing mechanism may urge the bolt towards the lug aperture, such that the bolt may be urged toward being located partly within the aperture of the lug and partly within the channel. By having the bolt partly disposed in the channel and partly disposed in the lug aperture, the lug is locked to prevent movement in a direction orthogonal to longitudinal direction of the channel. Thus, prevention of separation of the first and second sections of the housing can be achieved.

Moreover, the provision of a biasing mechanism as described above may allow a fail-safe device in the arrangement. This is because the default position of the housing sections is in a locked position whereby the bolt is partly disposed within the channel and partly disposed within the aperture of the lug.

In some arrangements, the channel may be a straight channel and the bolt may be a straight bolt slidable along the channel.

In other arrangements, the channel follows a non-linear longitudinal direction, for example an arc, and the bolt follows at least a portion of the same shape. For example, the bolt may take the form of a curved member, similar to the shackle of a padlock.

The bolt may be enclosed within the channel by the provision of a shoulder arrangement or other arrangement. This arrangement may prevent the bolt from exiting the channel, thereby ensuring no loss of parts. Apart from loss of parts being detrimental to the system as replacements would be necessary, the lost parts may also end up lying in a space of the aircraft. Due to movement of the aircraft, these lost parts move around and as such be the cause of structural damage, thereby compromising the integrity of many components of the aircraft. Accordingly, by retaining the bolt, this can be prevented.

In some arrangements, the channel may be a close-ended channel which may be bored from one end of the housing section. The open end of the channel may comprise a shoulder to prevent removal of the bolt and/or the biasing mechanism from the channel.

In some arrangements, the channel may be an open-ended channel at both ends. One or both of the open ends of the channel may comprise a shoulder to prevent removal of the bolt and/or the biasing mechanism from the channel.

The opening in the channel may be at one end of the channel or may be at any extent along the channel such that the channel may be divided into multiple sections, with a section on either side of the opening. The division may be an equal division, i.e. a bisection of the channel.

In some arrangements, multiple openings may be provided along the channel of the locking system, for engagement with multiple lugs on the other section of the housing. The openings may be located at extents along the channel to divide the channel equally, i.e. a trisection of the channel where there are two lugs concerned.

The shape of the aperture in the lug and of the lug itself may vary. In some arrangements, the outer periphery of the lug may be shaped to be flush with the outer periphery of the locking system when the lug is engaged in the opening of the locking system.

In some arrangements, the aperture in the lug may comprise a circular hole which may be fully surrounded by material of the lug about its circumference. The channel may have a circular cross-section and the circular hole may have a diameter equal to, smaller than or larger than the internal diameter of the channel. Preferably, the diameters of the channel and the lug aperture differ to within 20%, preferably within 10%, further preferably within 5% and even further preferably within 3% of one another. This helps to reduce relative movement between the sections of the housing when the bolt is engaged with both the channel and the lug aperture in an engaged (i.e. locked) position.

The channel and the lug aperture may also have different shaped cross-sections from one another, such as circular, triangular, square or other regular or irregular, convex or concave polygonal shape. In some arrangements, the bolt may not be able to rotate within the channel if both the bolt and the channel comprise a closely-fitting polygonal non-circular shape.

The lug aperture, channel and bolt may all have the same shaped cross-section as one another, such as a circular, triangular, square or other regular or irregular, convex or concave polygonal shape.

In some arrangements, the cross-section of the bolt may be the same along the entire length of the bolt. In other arrangements, the cross-section of the bolt may vary in either shape or size, or in both shape and size along the length of the bolt. Such variations may be gradual, or may be step-wise.

In some arrangements, the cross-section of the channel may be the same along the entire length of the channel. In other arrangements, the cross-section of the channel may vary in either shape or size, or in both shape and size along the length of the channel. Such variations may be gradual, or may be step-wise.

In some arrangements, the lug aperture comprises a circular cross-section, or other shaped cross-section, and is fully surrounded by a periphery of the lug. Such fully-surrounded apertures may be hereinafter referred to as "O-shaped" apertures, or "O-shaped" lugs. Such surrounding allows for a secure connection between the lug and the bolt. However, the lug can only be separated from the opening in the channel once the bolt has been completely removed from the lug aperture. In such arrangements, the bolt may be operatively connected to a handle. When a tensile force is applied to the handle, a force is applied to the bolt in a direction opposite to the urging force of the biasing mechanism. If the tensile force is great enough, the bolt may be moved along the channel in a direction opposite to the biasing direction of the biasing mechanism. The bolt may thereby be moved along the channel away from the opening such that it no longer engages with (passes through) the aperture of the lug. Consequently, the lug may be removed from the opening and the sections of the housing can then be separated at that point.

In another arrangement, the lug may comprise a circular aperture with some of the circumferential material around the periphery being cut-away to form a "C-shaped" lug. The cut-away section may comprise a small arc of the circumference of the lug which is less than half the circumference of the aperture. For example, if the aperture is round and the circumference is $2\pi R$ where R is the radius of the aperture, then the cut-away portion will be an arc less than $\pi R$. Preferably, the arc will be smaller than $\pi R/2$ and more preferably less than $\pi R/3$. By providing a small cut-away arc, the remaining portion of the circumference (the "legs") on either side of the cut-away portion provides a contact surface with the bolt which prevents the lug from disconnecting from the bolt.

This arrangement also extends to non-circular apertures which have a cut-away section, or "gap", which has a dimension, or "gap width", measured across the opening smaller than a parallel dimension measured across the cross-section of the lug aperture. Thus, the arrangement extends to include cross-sections having both mirror and non-mirror symmetry. Nevertheless, for ease of reference, all such shapes of the lug with cut-away sections shall hereinafter be referred to as "C-shaped" lugs, and the apertures therein as "C-shaped" apertures.

The bolt may comprise a single cross-section along its length in the manner described for the previous preferred arrangement. The bolt would thus need to be completely removed from the lug aperture along the channel by pulling a handle, as described above, to apply a force on the bolt to oppose a force of a biasing mechanism.

Advantageously, in the "C-shaped" lug arrangement, the bolt may comprise a gradually varying or step-wise varying cross-section. In embodiments where the bolt has a wider and narrower portions and the lug is a "C-shaped" lug, the bolt need not be completely removed from the lug aperture to unlock the housing. Instead, the bolt needs to be moved along the channel until a wider portion of the bolt no longer passes through the gap of the lug and instead only the narrower portion passes through the gap of the lug. When this takes place, the lug can be pulled free of the bolt since the width of the opening in the "C-shape" of the lug (i.e. the gap width) is large enough to allow the narrower portion of the bolt to pass through the gap in the lug perimeter.

A narrower portion of the bolt may be a portion of the bolt having a cross-section which is sized so that the "legs" of the narrower opening of the "C-shaped" lug can pass without interference around the narrower portion of the bolt. A wider portion of the bolt may be sized such that the legs of the "C-shaped" lug are unable to pass around the bolt without resistance and/or interference, thereby providing a locked position.

In arrangements where bolts have multiple cross-sections and the aperture of the lug is "C-shaped", movement of the bolt in the channel against a biasing mechanism may be achieved in the manner described above, i.e. a handle may be used to apply a pulling force to the bolt, to thereby oppose the force of the biasing mechanism and allow the wider portion of the bolt to be removed from the "C-shaped" lug aperture.

In this case, since aperture is "C-shaped", it is possible for the lug and opening to be separated even when there is an object passing through the channel. Accordingly, in addition to the possibility that the biasing mechanism may be a compression spring which may be compressed, it is also possible to have an extension spring which may be stretched by the pulling.

An alternative arrangement for the mechanism may be the provision of a button (i.e. a handle for compressive force). Application of a compressive force to the button may cause the bolt to slide deeper within the channel such that the wider portion of the bolt does not traverse the lug aperture and instead a narrower portion of the bolt traverses the lug aperture. The force may act against a biasing mechanism, which may for example comprise a compression spring or an extension spring.

An alternative to the above arrangements, if the bolt comprises an arc, there may be provided a biasing mechanism comprising a torque spring. To move the bolt through an arc-shaped channel to either remove it from the channel opening completely, or to remove only a wider portion of the bolt from the opening, a torque handle may be provided. A torque applied to the torque handle may cause the arc-shaped bolt to translate along the arc-shaped channel against an urging force.

In any of the above arrangements, the resistance to motion of the bolt and the mass of the bolt should preferably be such that normal working conditions and environmental conditions of an aircraft should not cause the bolt to translate along the channel away from the opening of the channel, i.e. such that, if engaged with the lug aperture, it would disengage from the lug aperture. Thus, the bolt should be sufficiently lightweight and the biasing mechanism should be sufficiently stiff that acceleration forces occurring on an aircraft in normal working conditions should be unable to move the bolt far enough such that the lug disengages.

In some arrangements, there may be a plurality of lugs. These may comprise multiple "C-shaped" lugs together with a pull, push or torsion arrangement, or may comprise an "O-shaped lug" (i.e. a fully surrounded aperture) together with one or more "C-shaped" lugs which connect to a pull or torsion arrangement.

In some arrangements, a "C-shaped" lug may comprise angled snap-fit-type protrusions on the "legs" of the "C-shape". In such arrangements, the bolt may comprise what will be subsequently described as a "D-shape". A "D-shape" can be best understood as an initially increasing cross-sectional width when viewed from a direction of first engagement with the lug, followed by a narrowing step or abrupt end of the cross-section of the bolt, which may be best provided by a flat surface. Such shapes are not limited specifically to a "D-shape".

In order to lock the housing, the "C-shaped" lug can be pushed against the bolt which is in the locked position, without the need to press a button, pull a handle or twist a handle to move the bolt into the unlocked position. Instead, as the "C-shaped" snap fit legs move over the "D-shaped" bolt, the legs of the "C-shaped" lug are forced apart until the snap-fit connections are able to spring back together once they pass the sudden decrease in width given by the flat abrupt edge of the "D-shaped" bolt. Thus quick connection whilst closing can be ensured by the snap-fit connection. These snap-fit connections are of the type which is very tight and cannot be undone simply by pulling the sections of the housing apart manually. Thus, for example, twisting or pulling a handle or pushing a button may be required to move the bolt along the channel, either to remove the bolt entirely from the lug aperture, or just to remove the wider portion of the bolt from the aperture of the lug, in order to unlock the housing.

Viewed from a second aspect, the invention provides a method of connecting and/or disconnecting a cable comprising two cable parts using a quick connect and disconnect arrangement for a cable, wherein the arrangement comprises: a housing comprising a first section and a second section; wherein one of the first section and the second section comprises a protruding lug having an aperture therein; and wherein the other of the first section and the second section comprises a locking system, the locking system comprising: a channel; an opening disposed along a portion of the channel; and a bolt; wherein connecting a cable comprises: joining two cable parts together to form a joined cable; arranging the joined cable within one of the first and second sections of the housing; enclosing the cable with the other of the first and second sections of the housing; positioning the lug in the opening of the locking system to thereby align the channel with the aperture; and moving the bolt within the channel in order to engage the bolt with the aperture; and wherein disconnecting a cable comprises: moving the bolt within the channel in order to disengage the bolt from the aperture; removing the lug from the opening of the locking system; separating the two sections of the housing; removing the joined cable from the housing; and separating the joined cable into two cable parts.

The two cable parts of the joined cable may be joined using a hammer joint, for example.

The method may comprise using a handle or button to twist, pull or push the bolt along the channel to a disengaged position where the bolt is disengaged from the opening or from the lug aperture.

The method may comprise using a biasing mechanism to urge the bolt into an engaged position where the bolt is engaged in the opening or in the lug aperture.

There may be a sprung hinge connecting the first and second sections of the housing spaced apart from the locking system.

The aperture of the lug may be fully, or partially and mostly, surrounded by a periphery of the lug, and the method may comprise fully removing the bolt from the opening in the channel, in order to release the lug from the opening or insert the lug into the opening.

The aperture of the lug may be partially and mostly surrounded by a periphery of the lug, with a gap in the periphery of the lug; and the bolt may comprise a wider portion which cannot pass through the gap of the lug and a narrower portion which can pass through the gap of the lug. The method may comprise moving the bolt along the channel to cause the wider portion of the bolt to be removed from the opening and the narrower portion of the bolt to remain in the opening in order to release the lug from the opening or insert the lug into the opening.

In the above arrangements, one of the benefits provided by a handle or button is that a quick connect and disconnect can be achieved without the need for extra tools. The need for tools can result in economic loss if tools are lost, or even damage to the aircraft if the tools are accidentally left inside the aircraft.

The cable may comprise two cable parts joined together and the housing may be configured to hold the joined two cable parts.

In this arrangement, the housing prevents the two cable parts from moving relative to each other and thus from becoming disconnected.

The quick connect and disconnect arrangement may be provided at a bulkhead, for example, a bulkhead between the main body of an aircraft and a wing of the aircraft. This allows the cable, or control cable, to pass between the main body of the aircraft to the engine on the wing, for example and allows for ease of maintenance. For example, the cable can be disconnected at the quick disconnect arrangement, for replacement and/or maintenance of the engine.

The housing may be provided with shaped or profiled inner sides to fit the cables. This prevents the cables becoming disconnected in flight conditions, such as when exposed to vibrations. The cables are also carrying a load in tension of approximately 70 lbf (about 350 N), so no damage will be caused by a disconnect of the cables since they are not free to move to be able to disconnect.

BRIEF DESCRIPTION OF THE DRAWINGS

Various embodiments of the disclosure will now be described with reference to the following description and drawings by way of example only, and with reference to certain figures, wherein.

DETAILED DESCRIPTION

Figure 1:
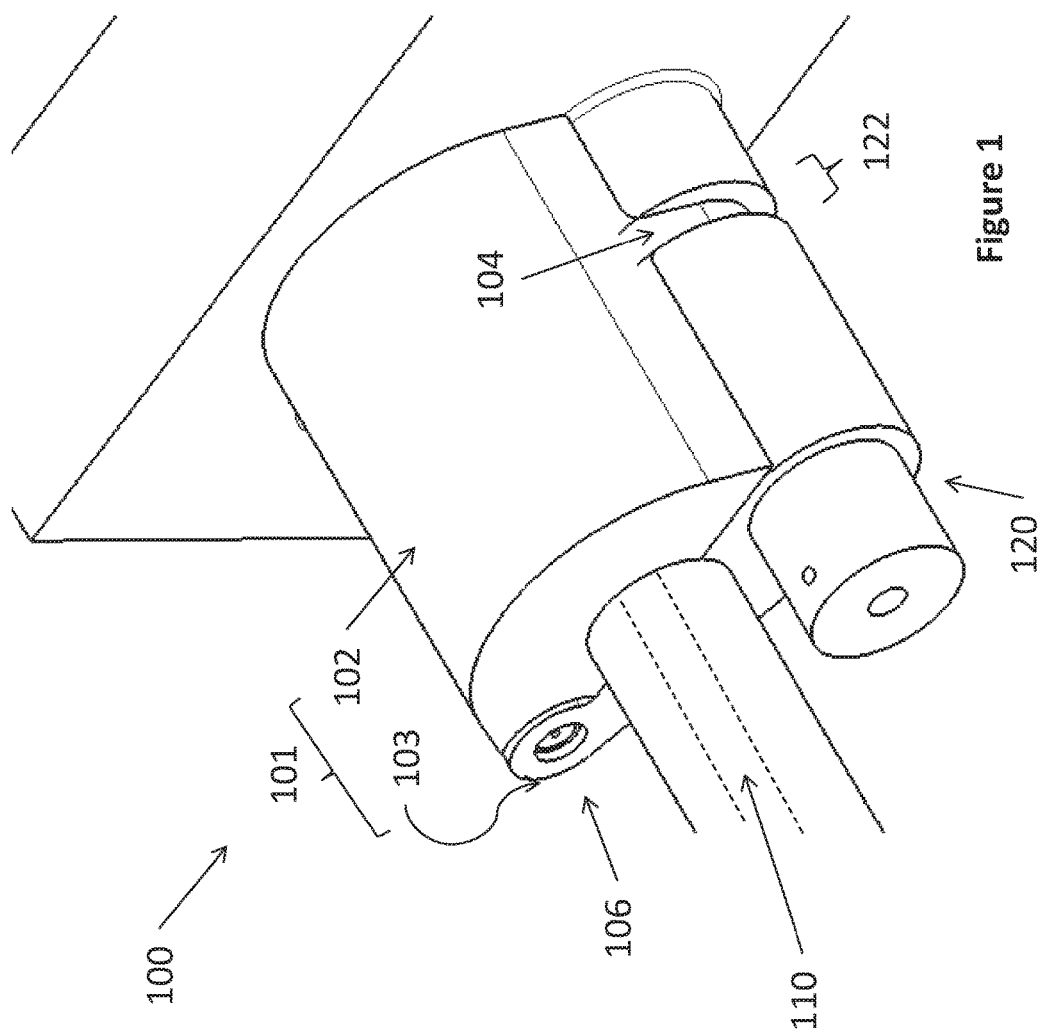
FIG. 1 shows a first quick connect disconnect arrangement, wherein the housing is closed.
Figure 2:
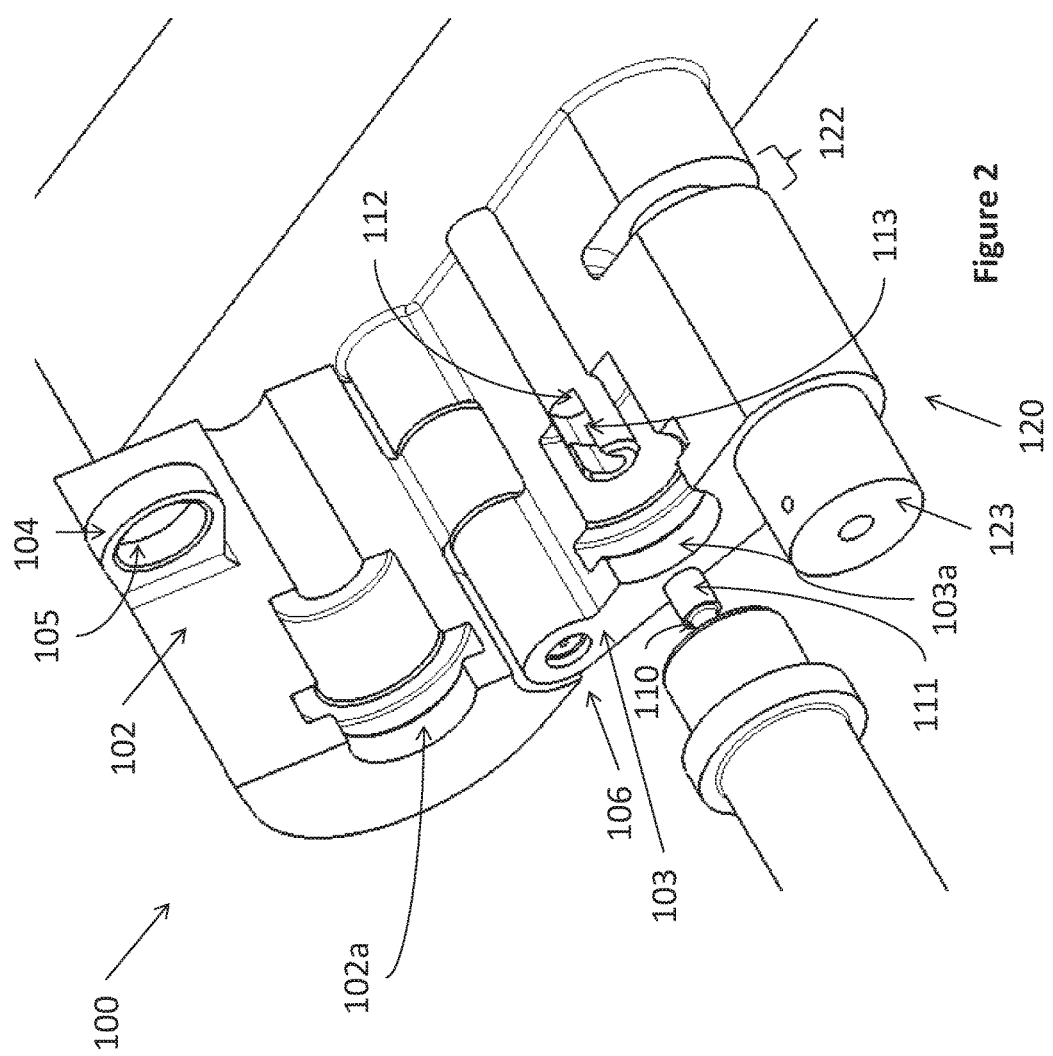
FIG. 2 shows the arrangement of FIG. 1 wherein the housing is open.
Figure 3:
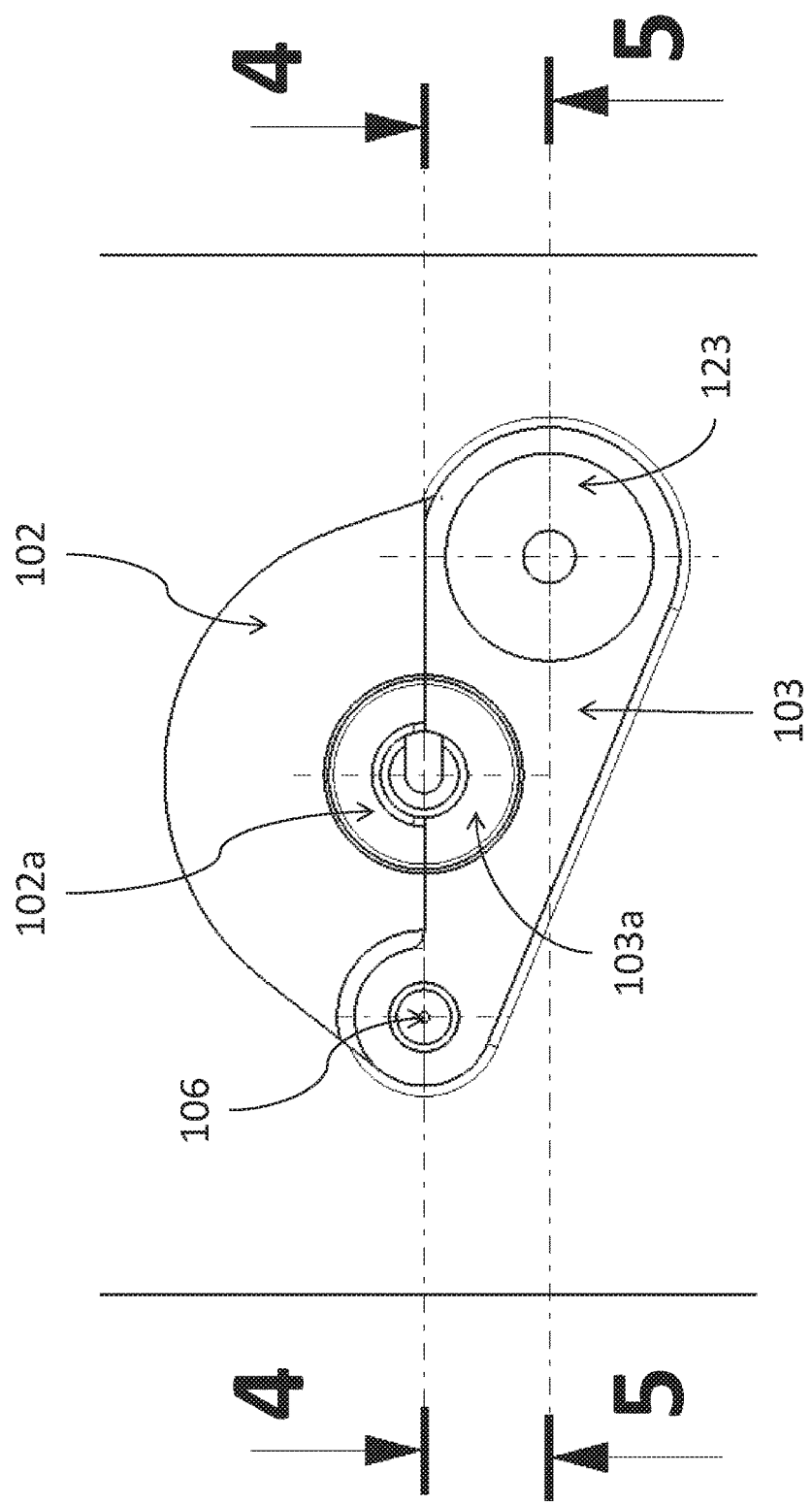
FIG. 3 shows a left hand side-view of the arrangement of FIG. 1 wherein the housing is closed.

FIGS. 1 to 5 show a first arrangement 100 for a quick connect disconnect arrangement for a cable. The arrangement 100 includes a housing 101 having a first section 102 and second section 103. As shown in FIG. 2, each of the sections 102, 103 of the housing 101 has a shaped or profiled inner portion 102a, 103a for support of a two-part cable 110, 113 (shown as dashed lines within the cable sheaths of FIGS. 1 and 6 and indicated directly in FIGS. 2 and 7) which is joined together using a hammer joint at connection points 111, 112.

Figure 4:
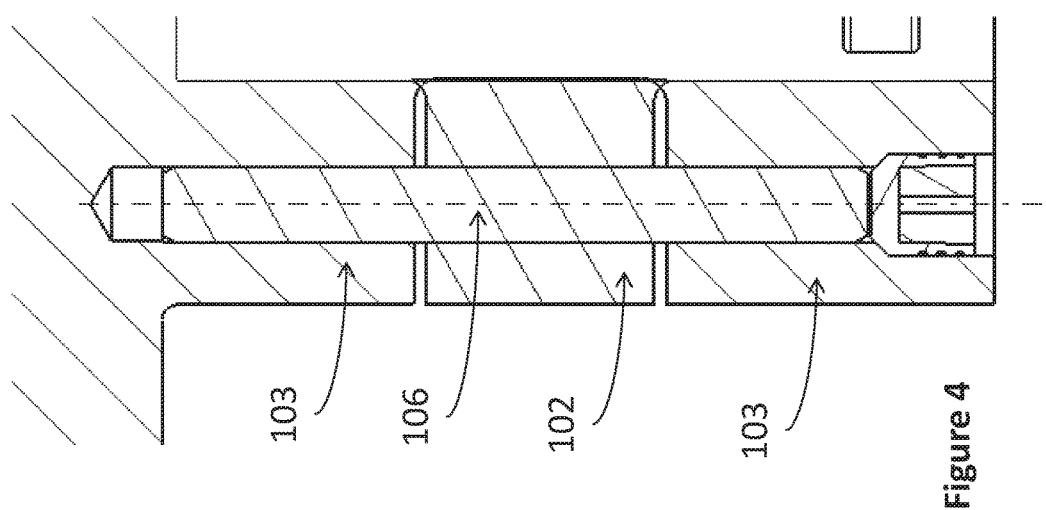
FIG. 4 shows a cross-section taken along line 4-4 of FIG. 3, passing through the centre of the hinge and cable of the arrangement of FIG. 1.

The first and second sections 102, 103 of the housing 101 are connected along one edge by a hinge having a hinge pin 106, as shown in FIG. 2 and in cross-section in FIG. 4.

The first section 102 of the housing comprises, at an opposite end to the hinge, a lug 104 having an aperture 105. The second section 103 of the housing 101 comprises a locking system 120 at the opposite end to the hinge. The locking system 120 can be seen in more detail in FIG. 5.

Figure 5:
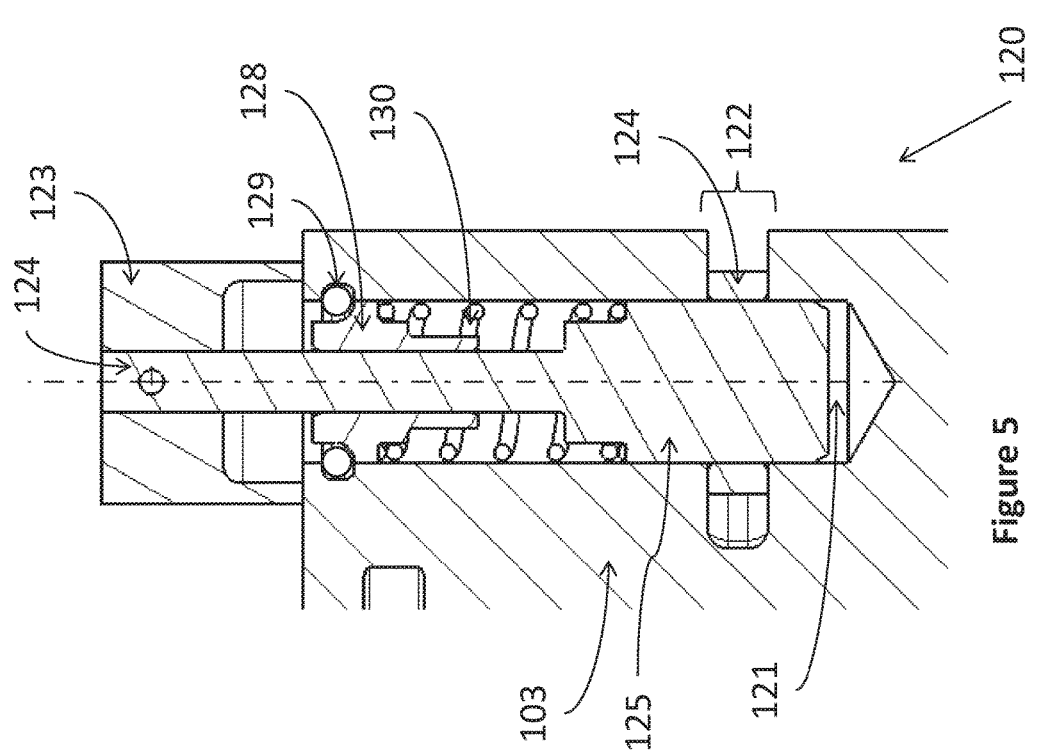
FIG. 5 shows a cross-section parallel to the cross-section of FIG. 4, but taken along line 5-5 of FIG. 3, passing through the centre of the locking pin.

FIG. 5 shows that the locking system comprises a channel 121 and an opening 122 into which the lug 104 can be placed (see also FIGS. 1 and 2). When the lug 104 is placed into the opening 122, the sections 102, 103 of the housing are closed around the cables 110, 113 and the aperture 105 of the lug 104 is aligned with the channel 121.

FIG. 5 also shows that a bolt 125 is held within the channel 121 and can move along the channel 121 to pass through both the channel 121 and the aperture 105 to engage the lug 104 in the opening 122. The bolt 125 is urged into the engaged position in the channel 121 by a biasing mechanism in the form of a spring 130. This in turn is held within the channel by means of a shoulder arrangement 128, which in turn may be held to the second section of the housing 103 by a retaining ring 129 fitted within a groove of the second section of the housing 103. A pin 124 connected to the bolt 125 passes through the shoulder arrangement 128. The pin 124 is connected to a portion 123 which is either a handle or an attachment portion for a handle. By pulling the handle, the pin 124 and thus the bolt 125 is pulled against the urging force of the spring 130. If the pulling force overcomes the urging force, the bolt 125 will move within the channel 121 away from the opening 122. With enough movement, the bolt 125 will move away completely from the opening 122 and disengage from the aperture 105 of the lug 104. Accordingly, the lug 104 can be removed from the opening 122 and the two sections 102, 103 of the housing 101 can be swung open about the hinge pin 106. In this way, the cable 110, 113 can be quickly accessed. The hinge might be sprung so that it will automatically open the housing 101 when the lug 104 is released.

Figure 6:
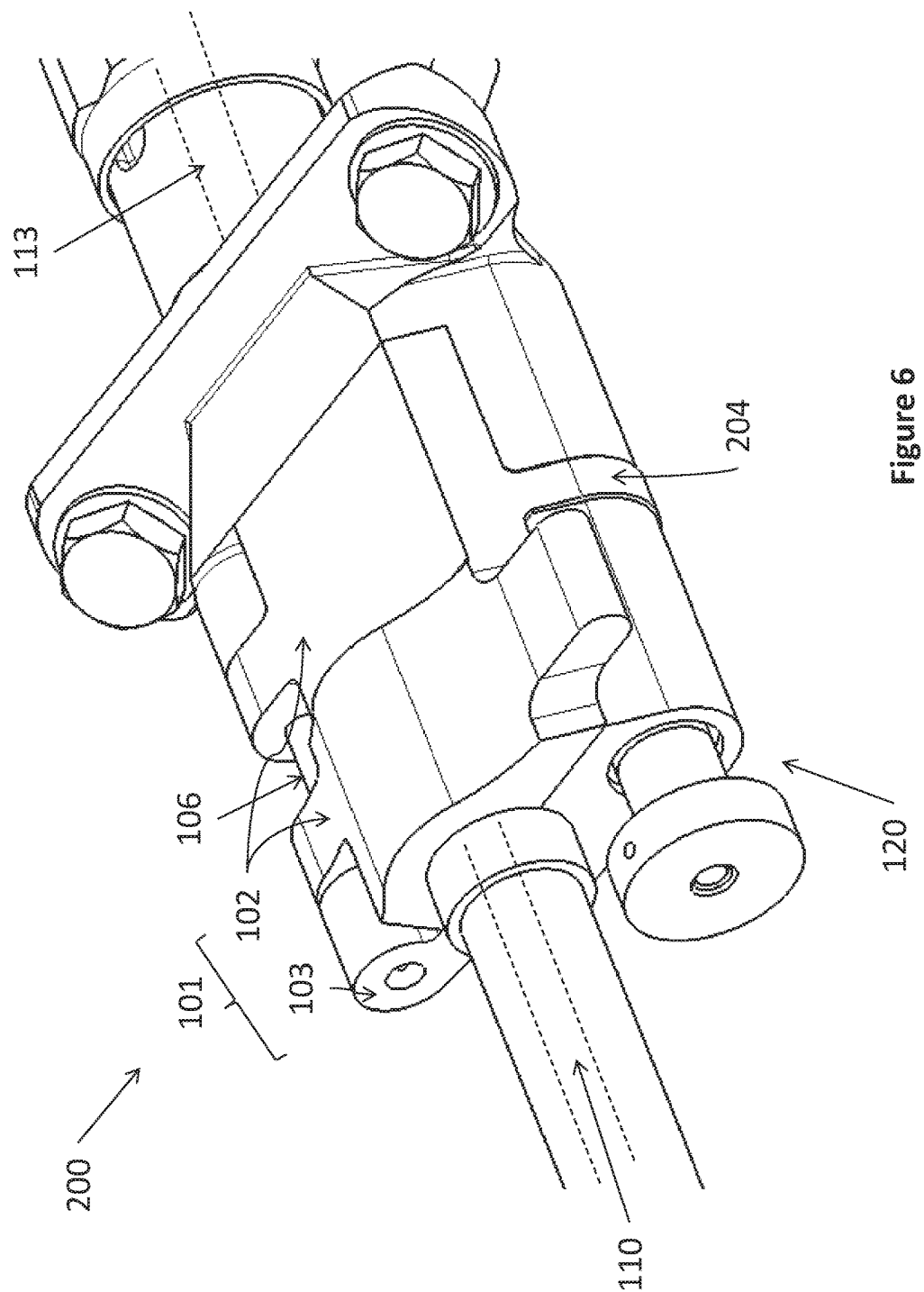
FIG. 6 shows a second quick connect disconnect arrangement, wherein the housing is closed.
Figure 7:
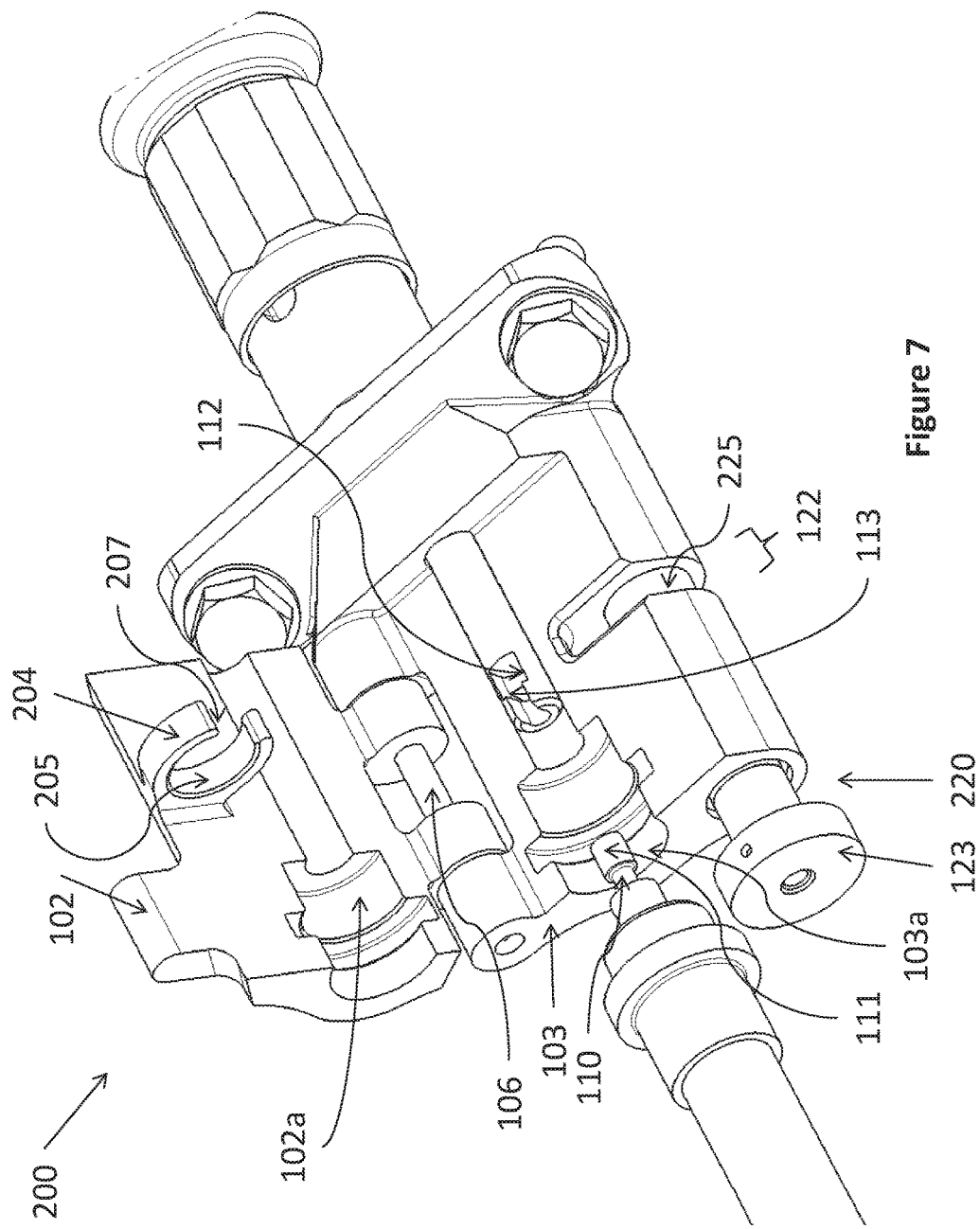
FIG. 7 shows the arrangement of FIG. 6 wherein the housing is open.

FIGS. 6 to 10 show a second arrangement 200 for a quick connect disconnect arrangement for a cable. The arrangement 200 includes a housing 101 having a first section 102 and second section 103. As shown in FIG. 7, each of the sections 102, 103 of the housing 101 has a shaped or profiled inner portion 102a, 103a for support of a two-part cable 110, 113 which is joined together using a hammer joint at connection points 111, 112.

Figure 9:
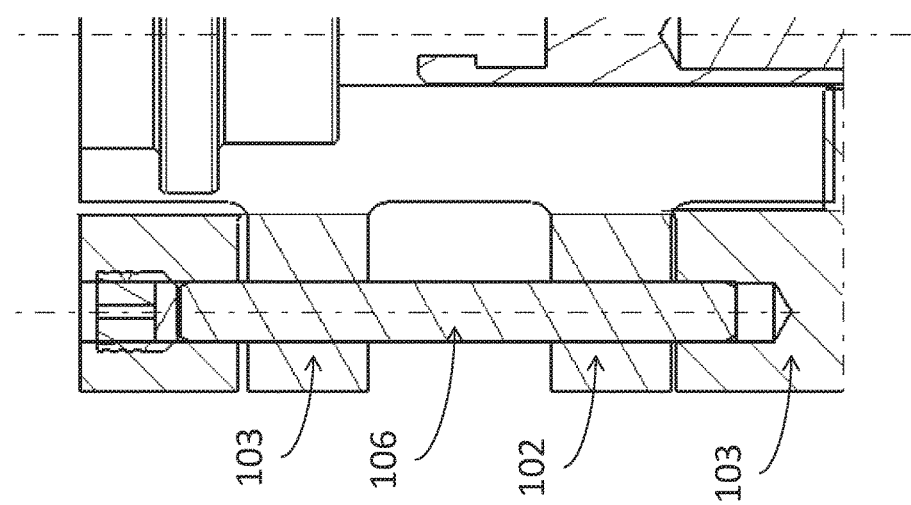
FIG. 9 shows a cross-section taken along line 9-9 of FIG. 8, passing through the centre of the hinge and cable of the arrangement of FIG. 6.

The first and second sections 102, 103 of the housing 101 are connected along one edge by a hinge having a hinge pin 106, as shown in FIG. 7 and in cross-section in FIG. 9.

The first section 102 of the housing comprises, at an opposite end to the hinge, a lug 204 having an aperture 205. The lug 204 is a "C-shaped" lug, having a gap 207 in the outer periphery of the lug. The second section 103 of the housing 101 comprises a locking system 220 at the opposite end to the hinge. The locking system 220 can be seen in more detail in FIG. 10.

Figure 10:
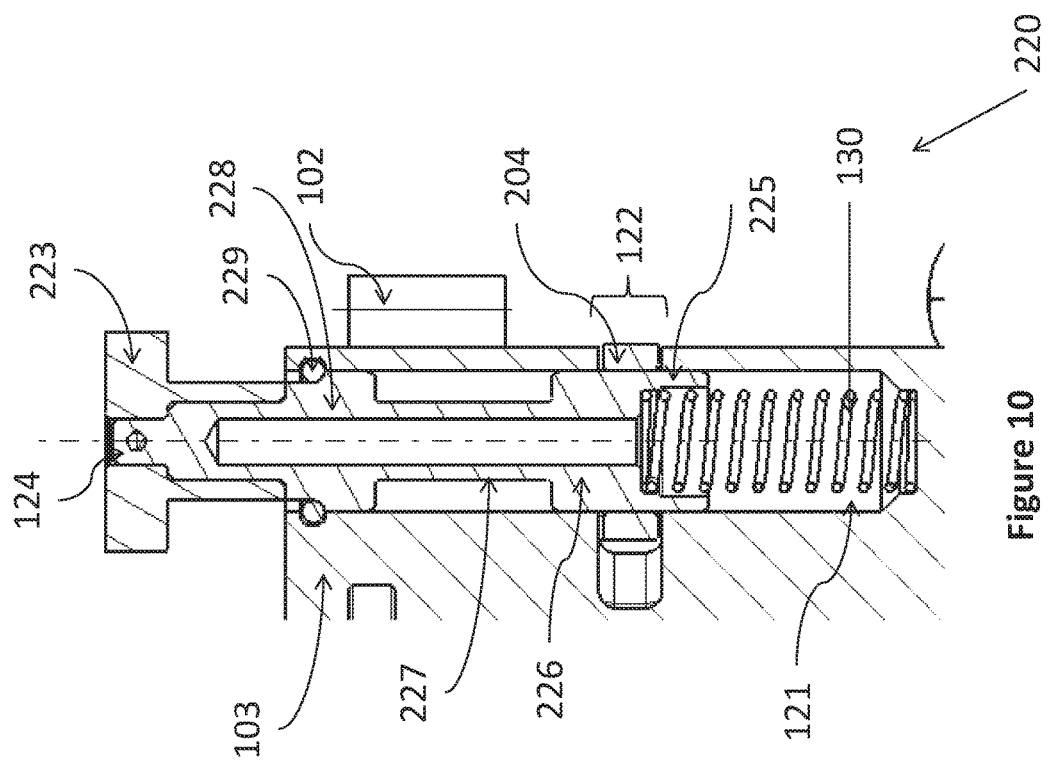
FIG. 10 shows a cross-section parallel to the cross-section of FIG. 9, but taken along line 10-10 of FIG. 8, passing through the centre of the locking pin.

FIG. 10 shows that the locking system comprises a channel 121 and an opening 122 into which the lug 204 can be placed (see also FIGS. 6 and 7). When the lug 204 is placed into the opening 122, the sections 102, 103 of the housing 101 are closed around the cables 110, 113 and the aperture 205 of the lug 204 is aligned with the channel 121.

FIG. 10 also shows that a bolt 225 is held within the channel 121 and can move along the channel 121 to pass through both the channel 121 and the aperture 205 to engage the lug 204 in the opening 122. The bolt 225 comprises a wider portion 226 and a narrower portion 227. The wider portion 226 is too wide to pass through the gap 207 in the lug 204, while the narrower portion 227 is sized appropriately so that it can pass through the gap 207 in the lug 204.

The bolt 225 is urged into the engaged position in the channel 121 by a biasing mechanism in the form of a spring 130. The bolt 225 is held within the channel by means of a shoulder arrangement 228 which may comprise a retaining ring 229 fitted within a groove of the second section of the housing 103. A pin 124 connected to the bolt 225 passes through the shoulder arrangement. The pin 124 is connected to a portion 223 which is either a button or an attachment portion for a button. By pressing the button, the pin 124 and thus the bolt 225 is pushed against the urging force of the spring 130. If the pushing force overcomes the urging force, the bolt 225 will move within the channel 121, such that the wider portion 226 of the bolt 225 moves along the channel 121 away from the opening 122, while the narrower portion 227 of the bolt 225 moves along the channel 121 towards the opening 122. With enough movement, the wider portion 226 of the bolt 225 will move away completely from the opening 122 and disengage from the aperture 205 of the lug 204. The narrower portion 227 of the bolt 225 which will then lie across the opening 122 is narrow enough to pass through the gap 207 in the lug 204. Accordingly, the lug 204 can be removed from the opening 122 and the two sections 102, 103 of the housing 101 can be swung open about the hinge pin 106. In this way, the cable 110, 113 can be quickly accessed. The hinge might be sprung so that it will automatically open the housing 101 when the lug 204 is released.

Other variations of the depicted arrangements are envisioned. For example, there may be two locking systems as that described above, with one locking system replacing the hinge.

Additionally or alternatively, it is envisioned that an arrangement having a bolt 225 comprising a wider portion 226 and a narrower portion 227 according to the arrangement of FIGS. 6 to 10 may comprise a tension spring instead of or in addition to the compression spring 130 depicted in FIGS. 6 to 10, to provide the biasing mechanism.

Figure 8:
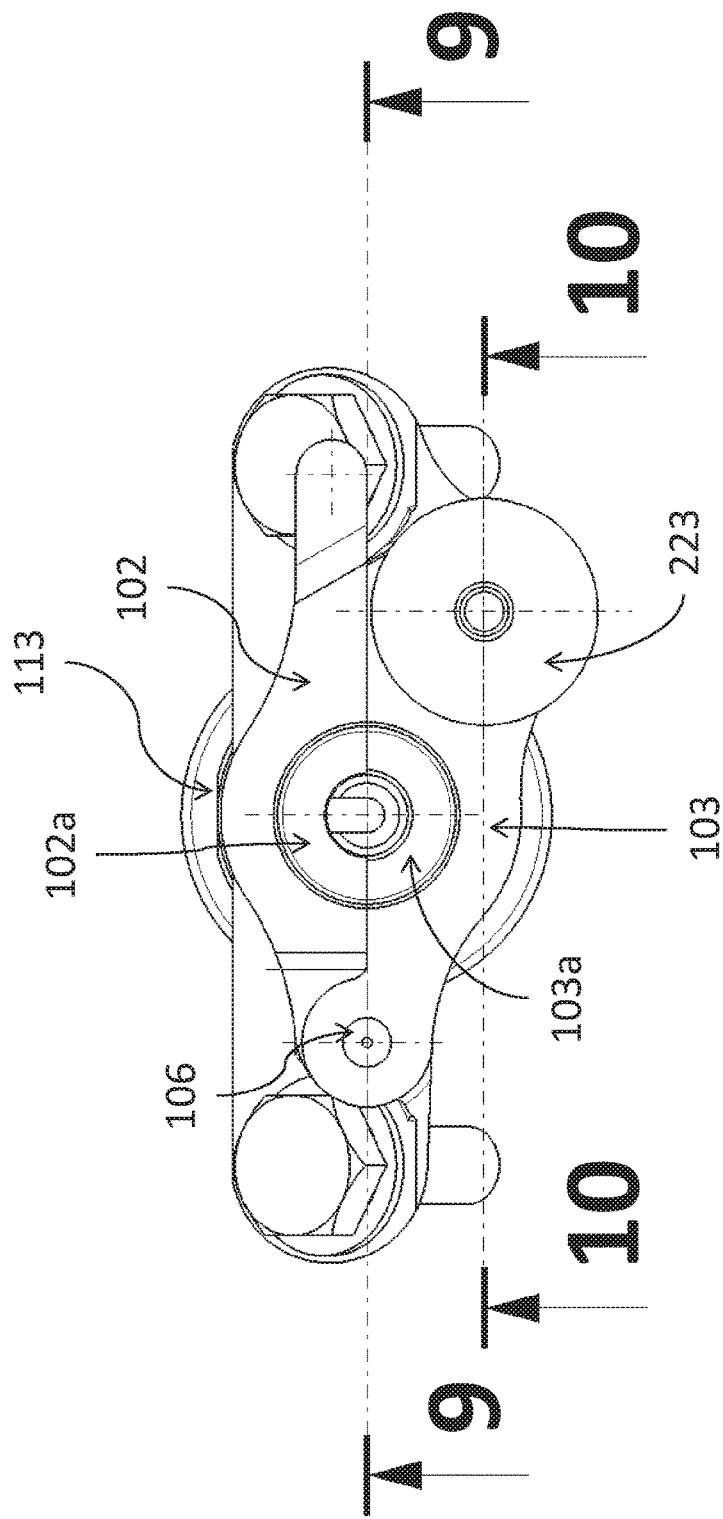
FIG. 8 shows a left hand side-view of the arrangement of FIG. 6 wherein the housing is closed.

Additionally or alternatively, it is envisioned that an arrangement having a bolt 225 comprising a wider portion 226 and a narrower portion 227 according to the arrangement of FIGS. 6 to 10 may comprise a handle 123 and a pulling mechanism in the manner described for the arrangement of FIGS. 1 to 5 instead of the button 223 and pushing mechanism described in the arrangement of FIGS. 6 to 8.

Thus, while this disclosure has been described as having a preferred arrangement, the present disclosure can be further modified, as will be understood to one skilled in the art, within the scope of the present disclosure as defined in the claims.

The invention claimed is:

1. A quick connect and disconnect arrangement for a cable comprising:
   a housing for holding the cable, the housing comprising a first section and a second section;
   wherein one of the first section and the second section comprises a protruding lug having an aperture therein;
   wherein the other of the first section and the second section comprises a locking system, the locking system comprising:
   a channel;
   an opening disposed along a portion of the channel and for receiving the lug; and
   a bolt configured to move within the channel;
   wherein when, in use, the housing is closed around the cable:
   the lug is positioned in the opening;
   the channel is aligned with the aperture; and
   the bolt is configured to move within the channel in order to engage with the aperture and thereby retain the lug in the opening;
   wherein the locking system further comprises a biasing mechanism for urging the bolt along the channel towards the opening.

2. An arrangement as claimed in claim 1, wherein the housing comprises a hinge connecting the first and second housing sections at a location spaced apart from the locking system.

3. An arrangement as claimed in claim 1, wherein the locking system is a first locking system and the lug is a first lug, wherein the housing further comprises:
   a second locking system, for connecting and disconnecting the first and second housing sections at a location spaced apart from the first locking system; and
   a second lug for engagement in an opening in the second locking mechanism.

4. An arrangement as claimed in claim 1, further comprising a button for pushing, to move the bolt along the channel away from the opening of the channel.

5. An arrangement as claimed in claim 1, wherein the aperture of the lug is partially and mostly surrounded by a periphery of the lug, the gap in the periphery of the lug having a gap width; and
   the bolt comprises a wider portion which cannot pass through the gap-width of the lug and a narrower portion which can pass through the gap-width of the lug;
   such that movement of the bolt along the channel to cause the wider portion of the bolt to be removed from the opening and a narrower portion of the bolt to remain in the opening in order to release the lug from the opening or insert the lug into the opening.

6. An arrangement as claimed in claim 1, wherein the cable comprises two cable parts joined together and the housing is configured to hold the joined two cable parts.

7. A method of connecting and/or disconnecting a cable comprising two cable parts using a quick connect and disconnect arrangement for a cable, wherein the arrangement comprises:
   a housing comprising a first section and a second section;
   wherein one of the first section and the second section comprises a protruding lug having an aperture therein; and
   wherein the other of the first section and the second section comprises a locking system, the locking system comprising: a channel; an opening disposed along a portion of the channel; and a bolt;
   wherein connecting a cable comprises:
   joining two cable parts together to form a joined cable within one of the first and second sections of the housing;
   enclosing the cable with the other of the first and second sections of the housing and thereby positioning the lug in the opening of the locking system to thereby align the channel with the aperture;
   moving the bolt within the channel in order to engage the bolt with the aperture; and
   using a biasing mechanism to urge the bolt into an engaged position where the bolt is engaged in the opening or in the lug aperture; and
   wherein disconnecting a cable comprises:
   moving the bolt within the channel in order to disengage the bolt from the aperture;
   removing the lug from the opening of the locking system;
   separating the two sections of the housing;
   removing the joined cable from the housing; and
   separating the joined cable into two cable parts.

8. A method as claimed in claim 7, comprising using a handle or button to twist, pull or push the bolt along the channel to a disengaged position where the bolt is disengaged from the opening or from the lug aperture.

9. A method as claimed in claim 7, wherein there is a sprung hinge connecting the first and second sections of the housing at a position spaced apart from the locking system.

10. A method as claimed in claim 7, wherein the aperture of the lug is fully, or partially and mostly, surrounded by a periphery of the lug, the method comprising fully removing the bolt from the opening in the channel, in order to release the lug from the opening or insert the lug into the opening.

11. A method as claimed in claim 7, wherein:
   the aperture of the lug is partially and mostly surrounded by a periphery of the lug, with a gap in the periphery of the lug; and
   the bolt comprises a wider portion which cannot pass through the gap of the lug and a narrower portion which can pass through the gap of the lug;
   the method comprising moving the bolt along the channel to cause the wider portion of the bolt to be removed from the opening and the narrower portion of the bolt to remain in the opening in order to release the lug from the opening or insert the lug into the opening.

* * * * *